United States Patent
Campagne et al.

(10) Patent No.: US 8,223,039 B2
(45) Date of Patent: Jul. 17, 2012

(54) METHOD AND A DEVICE FOR DETECTING A THRUST DISSYMMETRY OF AN AIRCRAFT DURING LANDING

(75) Inventors: Pierre Campagne, Toulouse (FR); Alexandre Broquet, Toulouse (FR); Nicolas Marty, Montauban (FR)

(73) Assignee: Airbus Operations (SAS), Toulouse (FR)

( * ) Notice: Subject to any disclaimer, the term of this patent is extended or adjusted under 35 U.S.C. 154(b) by 278 days.

(21) Appl. No.: 12/786,180

(22) Filed: May 24, 2010

(65) Prior Publication Data
US 2010/0302074 A1    Dec. 2, 2010

(30) Foreign Application Priority Data
May 28, 2009   (FR) ................................. 09 02570

(51) Int. Cl.
G01C 21/00   (2006.01)
G01C 23/00   (2006.01)
(52) U.S. Cl. ................... 340/971; 340/945; 340/978
(58) Field of Classification Search ............... 340/971, 340/945, 978
See application file for complete search history.

(56) References Cited

U.S. PATENT DOCUMENTS

| | | | | |
|---|---|---|---|---|
| 4,484,191 A * | 11/1984 | Vavra | | 340/965 |
| 7,088,264 B2 * | 8/2006 | Riley | | 340/963 |
| 2008/0188998 A1 * | 8/2008 | Venios et al. | | 701/3 |
| 2009/0320445 A1 * | 12/2009 | Dupre | | 60/228 |
| 2010/0079308 A1 * | 4/2010 | Fabre et al. | | 340/951 |
| 2010/0241332 A1 * | 9/2010 | Andrieu | | 701/100 |
| 2011/0046823 A1 * | 2/2011 | Ezerzere et al. | | 701/4 |

FOREIGN PATENT DOCUMENTS
EP   1512627   3/2005

OTHER PUBLICATIONS

Aviation Safety Council, Taipei, Taiwan: "GE 536 Occurrence Investigation Reoprt," No. ASC-AOR-06-03-002, Mar. 17, 2006, pp. 12-102.

* cited by examiner

Primary Examiner — Travis Hunnings
(74) Attorney, Agent, or Firm — Novak Druce + Quigg LLP

(57) ABSTRACT

A method and a device for detecting a thrust dissymmetry of an aircraft during a landing are disclosed. The detection device (6) comprises means (7) for detecting, upon a landing, that at least one of the engine control levers occupies an intermediary position comprised between a position threshold and a maximum speed position, as well as at least another engine control lever occupies an idling position, and means (9, 13) for triggering a warning when a landing condition is validated and at least one of the control levers occupies said intermediary position, at least another control lever occupying said idling position.

10 Claims, 3 Drawing Sheets

METHOD AND A DEVICE FOR DETECTING A THRUST DISSYMMETRY OF AN AIRCRAFT DURING LANDING

CROSS-REFERENCE TO RELATED APPLICATIONS

This application claims priority to French Patent Application 0902570, filed May 28, 2009, the contents of which are incorporated herein by reference.

FIELD OF THE INVENTION

The present invention relates to a method and a device for detecting a thrust dissymmetry of an aircraft upon landing. This invention also relates to an aircraft provided with such a device.

BACKGROUND OF THE INVENTION

Although not exclusively, the present invention is especially well adapted for aircrafts, the engines of which are provided with thrust inverters.

It is known that modern aircrafts, including transport civil aircrafts, are provided with engines individually controlled by throttle control levers. The latter could occupy several positions, each associated with an engine speed generating a determined thrust, amongst which an idling position and a take-off position. The engines of such aircrafts are frequently provided with thrust inverters, so that the control levers are further able to occupy a thrust inversion position, allowing for the activation of the thrust inverters, being generally arranged so that the idling position is interposed between the thrust inversion position and the take-off position.

Upon landing of an aircraft, before the wheels touch the runway, pilots cut off the thrust of the engines or take over the regulation that was automatic (associated with the self-lever mode) through bringing or taking the control levers in the idling position. Then, they are able to activate the thrust inverters, bringing the control levers in the thrust inversion position so as to perform a braking through a thrust inversion. When such braking is achieved, pilots deactivate the thrust inverters bringing the control levers in the idling position, from the thrust inversion position.

Technological developments provided to managing aircraft control levers (including, removing the motorization of the levers) have led to the introduction of a monitoring based on the position of said levers upon landings, so as to remind the crew to put the control levers in an idling position during flaring upon landing and before the wheel touch. Such a monitoring is generally performed by a flight warning calculator on board the aircrafts.

Such a monitoring is characterized by the single and systematic emission of a speech reminding indication when the altitude of the aircraft is at the most equal to an altitude threshold (10 or 20 feet depending on the landing mode), so as to remind pilots to bring the throttle control levers in the idling position. Such a reminding indication has the shape of a speech synthesis, optionally preceded or not by a announcement of the usual altitude of the aircraft. It is routinely emitted upon each flight of the aircraft, whatever the position of the control levers.

Moreover, upon a landing, when the altitude of the aircraft is below the altitude threshold, this same reminding indication, is emitted at regular intervals as long as at least one of the three following conditions is not met:
- one of the control levers occupies the thrust inversion position;
- the control levers occupy the take-off position;
- the control levers occupy the idling position.

However, the above mentioned monitoring does not take into account some cases of lever dissymmetry able to generate critical situations, such as going off a runway as a result of a position dissymmetry for the control levers upon a landing.

Indeed, after the wheels have touched the ground, upon bringing the control levers in the idling position or in the thrust inversion position, at least one control lever could remain in a position ahead of the idling position, i.e. associated with a higher engine speed than the idling speed, generating a first case of dissymmetry in the position of the control levers.

When such a dissymmetric position of the control levers is detected by the warning calculator upon a landing, the latter triggers a red warning comprising the steps consisting of:
- emitting a sound warning in the shape of a disharmonious and repetitive chime sound (or CRC warning for <<Continuous Repetitive Chime>>);
- triggering a light on a flight control interface; and
- displaying a text message on an engine warning screen in the cockpit of the aircraft.

However, the warning calculator does not take into consideration, upon landing, a second case of position dissymmetry for the control levers resulting from the latter being inappropriately handled. More precisely, after the wheels have touched the runway, upon the deactivation of the thrust inverters (i.e. when the control levers switch from the thrust inversion position to the idling position), at least one control lever can be depressed inadvertently in a position ahead of the idling position, corresponding to an engine speed higher than the idling speed.

Such a position dissymmetry for the control levers generates a thrust dissymmetry of the aircraft engines, upon the ground running phase (following a braking through thrust inversion), able to cause the aircraft to go off the runway.

SUMMARY OF THE INVENTION

The aim of the present invention is to detect the second case of position dissymmetry for the control levers of an aircraft and to notify it to pilots, so that they immediately and unambiguously identify an exceptional situation.

To this end, according to this invention, the method for detecting, upon landing, a thrust dissymmetry of an aircraft provided with at least two engines individually controlled by control levers able to occupy several positions each associated with an engine speed, amongst which a position corresponding to the idling speed and a position corresponding to a maximum speed for take-off and go-around, is remarkable in that it comprises the following steps consisting in:

A/ determining preliminarily a position threshold being intermediary between said idling position and said maximum speed position, and such that, when at least one of said control levers is positioned between said position threshold and said maximum speed position and at least another of said control levers occupies said idling position, a thrust dissymmetry of the engines is observed;

B/ checking that at least one condition relating to landing is validated;

C/ detecting whether at least one of said control levers occupies an intermediary position comprised between said position threshold and said maximum speed position, as well as whether at least another control lever occupies said idling position; and D/ when said landing condition is validated and at least one of said control levers occupies said intermediary position, at least another control lever occupying said idling position, emitting at least one warning for the pilots of said aircraft, so as to notify them of a position dissymmetry of the control levers.

Thereby, according to this invention, the second above mentioned case can be detected of a lever position dissymmetry for notifying it to pilots.

Said position threshold can be selected such that, for instance, when the control lever of at least one of the engines occupies the latter and the other levers are in the idling position, the thrust dissymmetry of the engines is significant.

In the case where said control levers of said aircraft are able to occupy a derated take-off position corresponding to an engine speed lower than the engine speed of said maximum speed position, said emitted warning can be disrupted, when step D/ is performed, as soon as at least one of said control levers occupies a position comprised between said derated take-off position and said maximum speed position. Such a configuration of the levers is considered as the result of an intentional action of pilots (for instance when they wish to take off again).

Moreover, when step D/ is performed, the emitted warning can be disrupted as soon as said control lever occupying said intermediary position is brought by pilots in a position comprised between said idling position and said position threshold.

In addition, when the engines of the aircraft are provided with thrust inverters and the control levers are able to occupy a position associated with a thrust inversion speed, when step D/ is performed, the emitted warning is disrupted as soon as said control lever occupying said intermediary position is brought by pilots in a position comprised between said thrust inversion position and said position threshold.

Advantageously, said landing condition is validated when at least one of the following conditions is met:
said aircraft is in contact with the ground;
after having preliminarily touched the ground, said aircraft is in a wheel rebound phase during which it is no longer in contact with the ground. Thus, a disruption and then a reoccurrence of the warning are prevented in the wheel rebound phase, being a significant disturbance source for pilots.

Moreover, alternatively or additionally, in the case where said aircraft is provided with retractable air brakes able to occupy an extended position and a retracted position, said landing condition can be validated when said air brakes occupy said extended position.

Moreover, it could be advantageous to check that the position of the levers remains unchanged during a predetermined confirmation period (for instance equal to 1 s). This way, the warning is prevented from being untimely triggered, for instance after the levers have briefly been positioned in the dissymmetric configuration.

In addition, in order to activate the triggering of the warning, it could be desirable that the moving elements of the engines (for instance the blower for a turbo-engine) be in rotation. Thus, should one of the engines break down (through a procedure, the corresponding control lever is brought to the idling position and that of the operational engine(s) is brought to an position associated with an engine speed higher than the idling speed), the emission of the warning can be inhibited.

Furthermore, said warning is able to be triggered when at least one of the following activation conditions is validated:
the velocity of said aircraft is at least equal to a predetermined velocity threshold;
a predetermined time delay, triggered upon contact of said aircraft with the ground, is not completed.

Advantageously, said emitted warning comprises a continuous emission of a speech reminding indication, the emission rhythm of which is not regular. Preferably, the emission of the reminding indication could comprise a decrease of the break between two successive indications one time out of two. Besides, the sound volume of the reminding indication can be increased with respect to that usually implemented when the aircraft reaches the altitude threshold (10 or 20 feet) during the approach phase of a landing.

Insofar as the speech synthesis of the reminding indication is identical to that implemented routinely upon each landing, pilots readily understand the meaning of such an indication as they know it. Thus, they do not have to analyze a new indication. Besides, the irregular emission rhythm and the volume increase associated with the emission of such a reminding indication allow pilots to be warned that the configuration is not the usual lever oversight configuration upon landing and that they are to pay a quite special attention. The emission rhythm of the reminding indication is thus linked to the criticality of the event. Thus, it is ensured that the emitted warning is immediately and unambiguously understandable so that pilots are able to most rapidly correct the position of the lever(s).

Moreover, such a sound warning could also be combined with:
triggering a light, for instance on a flight control interface in the cockpit of the aircraft; and/or
displaying a text message, for instance on a screen in the cockpit of the aircraft.

The present invention further relates to a device for implementing the detection method such as previously described, on board an aircraft provided with at least two engines individually controlled by control levers able to occupy several positions, each associated with an engine speed, amongst which a position corresponding to an idling speed and a position corresponding to a maximum take-off and go-around speed.

According to this invention, such a device comprises:
means for determining a position threshold being intermediary between said idling position and said maximum speed position, and such that, when at least one of said control levers is positioned between said position threshold and said maximum speed position and at least another of said control levers occupies said idling position, a thrust dissymmetry of the engines is observed;
means for checking that at least one condition relating to landing is validated;
means for detecting that at least one of said control levers occupies an intermediary position comprised between said position threshold and said maximum speed position, as well as that at least another control lever occupies said idling position; and
means for triggering at least one warning to the pilots of said aircraft, when said landing condition is validated and at least one of said control levers occupies said intermediary position, at least another control lever occupying said idling position.

In the case where a flight warning calculator is on board the aircraft, the device can be advantageously integrated into such a calculator.

This invention also relates to an aircraft comprising a device such as mentioned herein above.

BRIEF DESCRIPTION OF THE DRAWINGS

The figures in the appended drawing will better explain how this invention can be implemented. In these figures, identical reference numerals relate to similar components.

DETAILED DESCRIPTION

Figure 1:
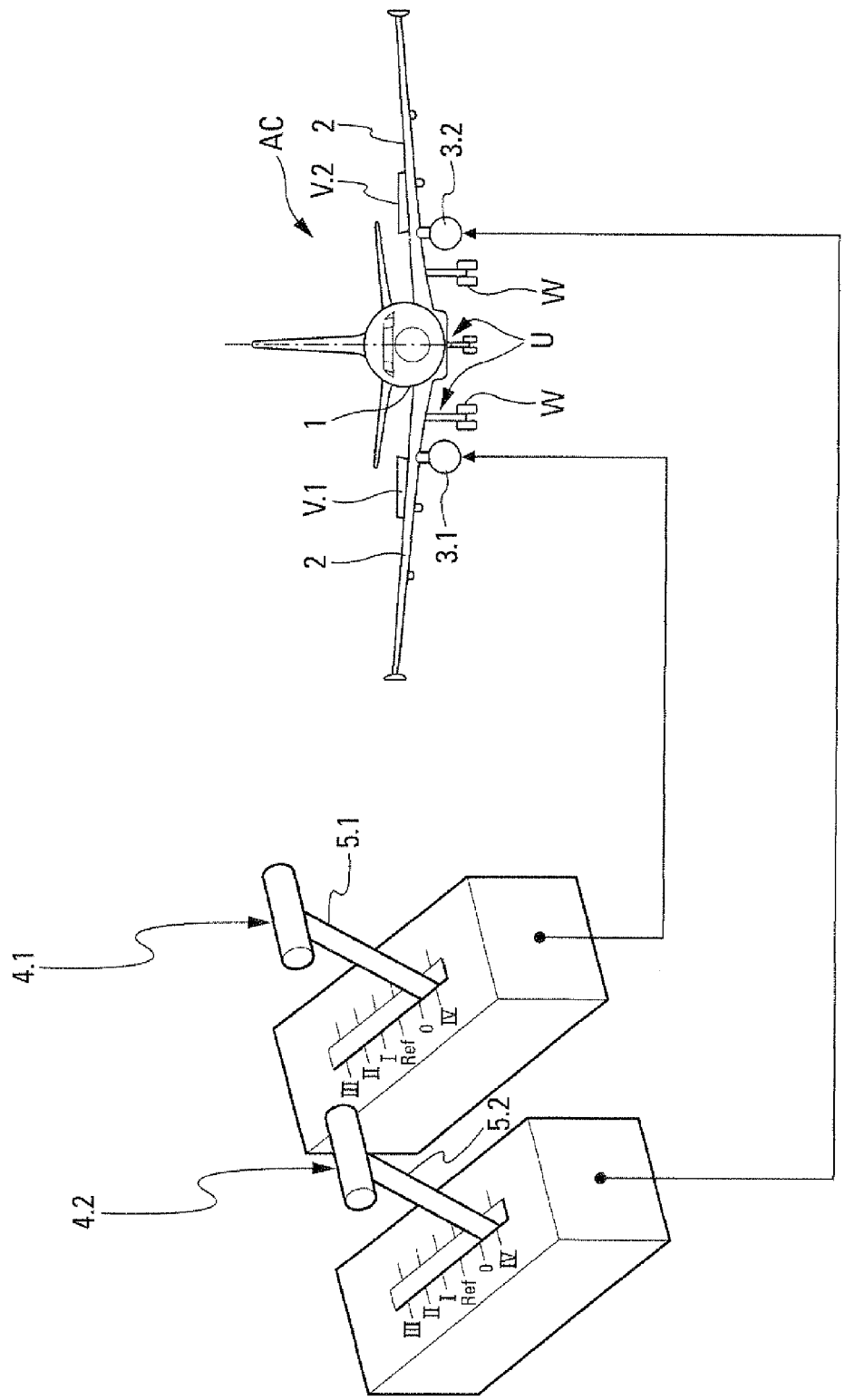
FIG. 1 schematically illustrates a bi-engine airplane and the throttle control levers thereof associated respectively with each of said engines. For clarity reasons in the drawing, the levers are represented outside said airplane.

The airplane AC, schematically shown from the top of FIG. 1, comprises a fuselage 1 and two wings 2, being symmetrical relative to said fuselage 1. On each one of the wings 2 there is mounted an engine 3.1, 3.2 provided with a thrust inverter. Obviously, alternatively, the airplane AC could be a four-engine or even a three-engine airplane with two of the three motors being symmetric with respect to the fuselage 1. Besides, it should be reminded that the present invention also applies to airplanes with engines being not provided with thrust inverters.

The airplane AC is further provided with retractable air brakes V.1 and V.2, able to simultaneously occupy either a retracted position or an extended position. They are extended during an approach phase, upon a landing. In an extended position, the air brakes flaps V.1 and V.2 cause a decrease in the lift of the aerofoil 2 of the airplane AC.

Besides, the airplane AC comprises front and rear landing gears U, each equipped with wheels W.

Usually, the speed of the engines of the airplane AC is individually controlled by a control lever 4.1, 4.2 associated with the corresponding engine 3.1, 3.2.

On FIG. 1, the control levers 4.1 and 4.2 of the engines 3.1 and 3.2 are represented outside the airplane AC, whereas they are, actually, mounted on board the cockpit thereof. Such levers 4.1 and 4.2 are able to occupy a plurality of positions amongst which the following referenced positions (designated by 0, I, II, III and IV on FIG. 1):

an idling position 0 associated with an idling speed;
a climbing position I associated with an engine speed generating a climbing thrust;
a derated take-off position II associated with an engine speed generating a derated take-off. Such a position can also be associated with an engine speed generating a continuous maximum thrust, implemented more specifically when at least one of the engines breaks down;
a maximum speed position III generating a take-off or go-around maximum thrust; and
a thrust inversion position IV allowing the thrust inverters to be activated. It is associated with an engine speed generating an opposite thrust.

The control levers 4.1 and 4.2 being each made of a non motorized lever 5.1, 5.2, being able to toggle from front to back and conversely around an axis, it is usual to mark their position with an angle defined with respect to the idling position 0, taken as the origin. Conventionally, for each lever 4.1, 4.2, the corresponding angle is positive, when it is associated with a position obtained when the lever 4.1, 4.2 toggles toward the front, from the idling position 0, and negative, when it is associated with a position resulting from the lever 4.1, 4.2 toggling toward the rear from the idling position 0.

The referenced positions I, II and III are positioned ahead of the idling position 0, respectively in that order, whereas the thrust inversion position IV is positioned behind the idling position 0. Naturally, this invention also applies to any other desired type of lever.

Furthermore, the airplane AC is usually provided with an automatic pilot (not shown), able more specifically to automatically regulate the speed of the engines when a <<self-lever>> automatic regulation mode is active, a flight control interface and a flight managing system. It also comprises a flight warning calculator (not shown) able to manage the emission of sound and/or visual warnings.

After having preliminarily been triggered by the pilots via the control interface, the self-lever becomes active when the levers are brought by pilots in an automatic regulation position, corresponding, for instance, to the climbing position I.

In a self-lever mode, the thrust of the engines is controlled either directly by pilots imposing a velocity set point via the control interface, or by the flight managing system.

Upon a landing, the approach can be performed in a self-lever mode, the levers 4.1 and 4.2 then occupying the automatic regulation position I ahead of the idling position 0.

Upon approaching the ground, in the absence of motorization of the levers 4.1 and 4.2, pilots must manually reduce the thrust of the engines bringing the levers 4.1 and 4.2 in the idling position 0, from the automatic regulation position I.

Afterwards, for instance when the wheels touch the ground, the pilots can order a thrust inversion braking bringing the levers 4.1 and 4.2 in the thrust inversion position IV, for activating the thrust inverters. Once the thrust inversion braking completed, the pilots should bring the levers back in the idling position 0, from the thrust inversion position IV, so as to deactivate the thrust inverters.

However, as previously indicated, the following lever position dissymmetry cases are likely to occur:

a first dissymmetry case: after the wheels have touched the ground, upon positioning the control levers in the idling position 0 or in the thrust inversion position IV (upon a thrust inversion braking), at least one control lever 4.1, 4.2 can remain in a position ahead of the idling position 0;
a second dissymmetry case: the pilots unintentionally bring at least one of the levers 4.1, 4.2 in a position ahead of the idling position 0 (i.e. associated with an engine speed higher than the idling speed), for instance from the inversion position IV upon the thrust inverters being deactivated.

According to this invention, the warning calculator of the airplane AC comprises a detection device 6 able to detect and trigger a warning when the second above mentioned dissymmetry case is met. Naturally, alternatively, the detection device can be integrated into another calculator of the airplane AC, different from the warning calculator.

Figure 2:
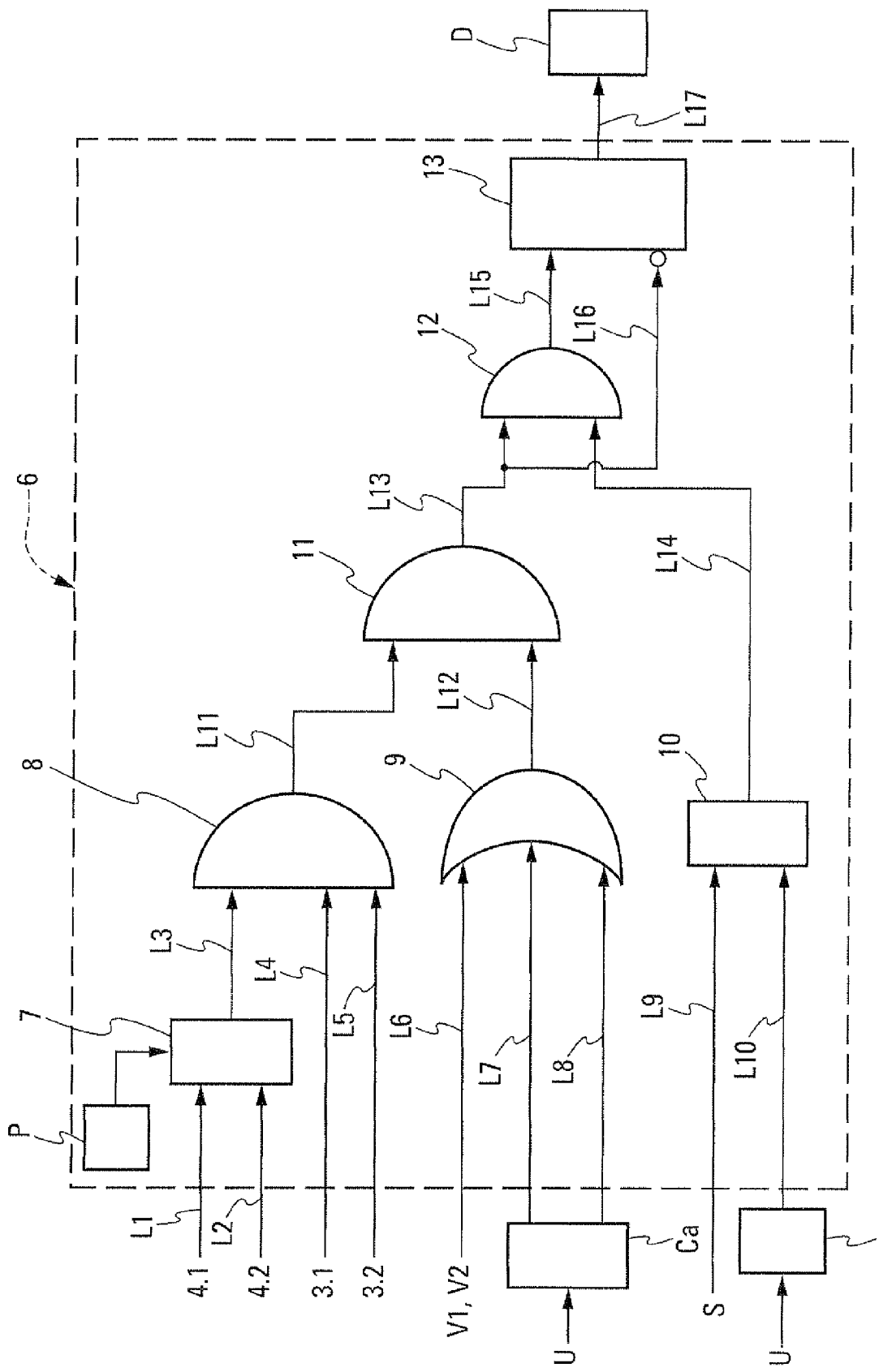
FIG. 2 is a block-diagram of the device for detecting the position dissymmetry of control levers, according to the present invention.

In a preferred embodiment represented on FIG. 2, the detection device 6 of the warning calculator comprises:

means P for determining a position threshold Ref (corresponding for instance to an angle of +6° with respect to the intermediary idling position 0) between the idling position 0 and the maximum speed position. The position threshold Ref is such that, when a lever 4.1, 4.2 is in the idling position 0 and the other lever 4.1, 4.2 occupies the position threshold Ref, a significant dissymmetric thrust is observed at the outlet of the engines 3.1, 3.2 requiring the pilots to act on the side control of the airplane AC. The position threshold Ref is associated with an engine speed generating a thrust (corresponding to a thrust threshold) preferably lower than the derated take-off thrust;

first detection means 7 receiving, at the input, through the links L1 and L2, position information emitted respectively by the control levers 4.1 and 4.2. They are further connected to the determination means P. When the levers 4.1 and 4.2 occupy the idling position 0, the first detection means 7 emit, at the outlet, a value <<0>>. On the contrary, when at least one of the levers 4.1, 4.2 occupies the idling position 0 and the other lever 4.1, 4.2 occupies an intermediary position, ahead of the idling position 0, comprised between the position threshold Ref and the derated take-off position II, the first detection means 7 emit, at the outlet, a value <<1>>. The detection means 7 can also wait during a confirmation time delay of the position of the levers (for instance equal to 1 s) before emitting a value (<<0>> or <<1>>). It should be noticed that, alternatively or additionally, the first detection means 7 can emit a value <<1>> on the additional condition that said levers 4.1 and 4.2 preliminarily occupied the thrust inversion position IV before occupying, for one of them, the idling position 0 and, for the other one, such an intermediary position;

a first three input AND logic gate 8, receiving at the inputs thereof the output value of the first detection means 7 as well as information relating to the rotation state of the moving elements (for instance the blower for a turbojet) of one of the engines 3.1, 3.2, via respectively links L3, L4 and L5. When the moving elements of both engines 3.1 and 3.2 are in rotation and the first detection means 7 deliver a value <<1>>, the first AND gate 8 emits at the output a value <<1>>. In the other cases (the moving elements of at least one of the engines 3.1, 3.2 do not rotate, value <<0>> delivered at the output of the first detection means 7, etc.), it emits a value <<0>>;

a first three input OR logic gate 9, receiving at the inputs thereof a signal representative of the state of the air brakes V1 and V2 of the airplane AC (taking the value <<1>> when the air brakes are extended and the value <<0>> in the opposite case), a signal representative of the contact of the wheels W of the airplane AC with the ground (taking the value <<1>> when the wheels W of the airplane AC touch the ground, and the value <<0>> in the opposite case) emitted by an on-board calculator Ca receiving information from the landing gears U, as well a signal representative of a rebound of the airplane AC after the wheels have touched the runway (taking the value <<1>> when the airplane AC rebounds on the runway (the wheels are no longer in contact with the runway), and the value <<0>> in the opposite case) emitted by the calculator Ca, through respective links L6, L7 and L8. When at least one of the signals takes the value <<1>>, then the first OR logic gate 9 emits, at the output, a value <<1>>;

checking means 10 able to receive, at the input, a signal representative of the velocity S of the airplane AC (taking a value <<1>> when the velocity S of the airplane AC is at the most equal to a predetermined velocity threshold (for instance equal to 40 kts), and a value <<0>> in the opposite case) and a one signal representative of a delay (for example equal to 60 s) triggered when wheels W touch the ground by an on-board calculator Cb (the time delay signal taking a value <<1>> when the time delay has not expired, and a value <<0>> at the expiry thereof), via respectively links L9 and L10. When a velocity signal reaches the checking means 10 (i.e., the velocity information S is available), the latter deliver at the output the value <<0>> or <<1>> that the velocity signal takes, whatever the value <<0>> or <<1>> of the time delay signal. On the other hand, in the case where no velocity signal reaches the checking means 10 (i.e., the velocity information S is unavailable), the latter emit, at the output, the value <<0>> or <<1>> corresponding to that the time delay signal takes;

a second AND logic gate 11, having its inputs respectively connected to the outlet of the first AND gate 8 and to the outlet of the first OR gate 9, via respective links L11 and L12. When each one of the inputs thereof receives a value <<1>>, the second AND gate 11 emits, at the output, a value <<1>>;

a third AND logic gate 12, having its inputs respectively connected to the output of the second AND gate 11 and to the output of the checking means 10, via respective links L13 and L14. When each one of the inputs thereof receives a value <<1>>, the third AND gate 12 emits, at the output, a value <<1>>; and a toggle RS 13. The priority input S of the toggle RS 13 is connected to the output of the third AND gate 12, via the link L15, and the input R is connected to the output of the second AND gate 11, via the link L16. The input R receives the opposite of the output value of the second AND gate 12 (i.e. if the output of the AND gate 12 is equal to <<1>>, it receives a value <<0>> and conversely). The toggle RS 13 is able to deliver, at the output, a signal for triggering a warning in the cockpit of the airplane AC, via the link L17. When the triggering signal takes a value <<1>> (for instance when the input S receives a value <<1>>, the input R then receives a value <<0>>), the warning is emitted. When this triggering signal takes a value <<0>>, the warning is not emitted or even the emission thereof is disrupted. Moreover, in the case where both inputs R and S simultaneously receive the value <<0>>, the triggering signal keeps its usual value (for instance the value <<1>> when the inputs R and S respectively received a value <<0>> and a value <<1>>, so that the emitted warning is not disrupted).

As shown on FIG. 2, the airplane AC further comprises a warning device D able to receive the triggering signal emitted by the toggle RS 13, via the link L17, and to emit a warning in the case where the value the triggering signal takes is equal to <<1>>.

Furthermore, usually, as has been previously mentioned, the warning calculator can control:

the emission of a reminding indication, in the shape of a speech synthesis, either in a unique and systematic way when the altitude of the airplane is lower than an altitude threshold (10 or 20 feet depending on the landing mode), or in a repetitive way at regular intervals when the altitude is below the altitude threshold, as long as at least one of the three following conditions is not met:

one of the levers 4.1, 4.2 occupies the thrust inversion position IV;

the levers 4.1 and 4.2 occupy the take-off position III;

the levers 4.1 and 4.2 occupy the idling position 0;

triggering a red warning in the case of a levers 4.1 and 4.2 dissymmetric position upon the activation of a thrust inversion activation (corresponding to the first above mentioned case of lever dissymmetry position), said red warning comprising:
the emission of a sound warning in the shape of a disharmonious and repetitive chime sound (CRC warning);
triggering a light on the flight control interface; and
displaying a text message on an engine warning screen in the cockpit of the aircraft.

According to the present invention, the warning triggered by the triggering signal at the output of the toggle RS13, for reporting a second lever dissymmetry case, is characterized by:
a continuous emission of a speech synthesis reminding indication, comprising a reduction of the break between two successive indications one time out of two. Thus, the emission rhythm of the reminding indication, according to this invention, is not regular; and
the fact that the sound volume of the reminding indication is increased with respect to that usually implemented upon the emission of the same speech indication.

The emission of such a reminding indication replaces the CRC sound of the red known warnings.

In so far as the speech synthesis of the reminding indication is identical to that implemented routinely upon each landing, pilots readily understand the meaning of such an indication as they know it. Thus, they do not have to analyze a new indication. Besides, the irregular emission rhythm and the volume increase associated with the emission of such a reminding indication allow pilots to be warned that the configuration is not the usual lever oversight configuration upon landing and that they are to pay a quite special attention. The emission rhythm of the reminding indication is thus linked to the criticality of the event.

The sound warning intended to report the second lever 4.1 and 4.2 dissymmetry case to the pilots can also be combined with:
triggering a light, for instance on the flight control interface; and
displaying a text message, for instance on the engine warning screen in the cockpit of the airplane AC.

It can be noticed that the detection device 6 takes into account a possible rebound of the airplane AC on the runway upon landing, in order to prevent the warning from disappearing and then reoccurring whereas it is running.

It is also to be noticed that the velocity condition of the airplane AC (triggering of the warning possible when the velocity S of the airplane AC is at the most equal to a predetermined velocity threshold of 40 kts) only occurs for triggering the warning (and not for disrupting it). Indeed, the monitoring remains active when running below 40 kts. For instance, if the levers are in a dissymmetric position at a velocity S equal to 50 kts, the warning is triggered (on the condition that the other triggering conditions are met). If subsequently, the velocity S becomes lower than 40 kts, but the levers 4.1, 4.2 remain in a dissymmetric position, the warning will be still emitted.

Moreover, according to this invention, as a result of the warning being triggered, the pilots can:
either stop the airplane AC: the warning is then deactivated if both levers 4.1 and 4.2 are positioned at the rear of the position threshold Ref (for instance in the idling position 0 or in the thrust inversion position IV);
or take off again: the warning is then deactivated if at least one of the levers 4.1, 4.2 occupies a position ahead of the derated take-off position. Such a threshold is justified by the fact that above such position II, the thrust to be applied is a take-off thrust.

Figure 3:
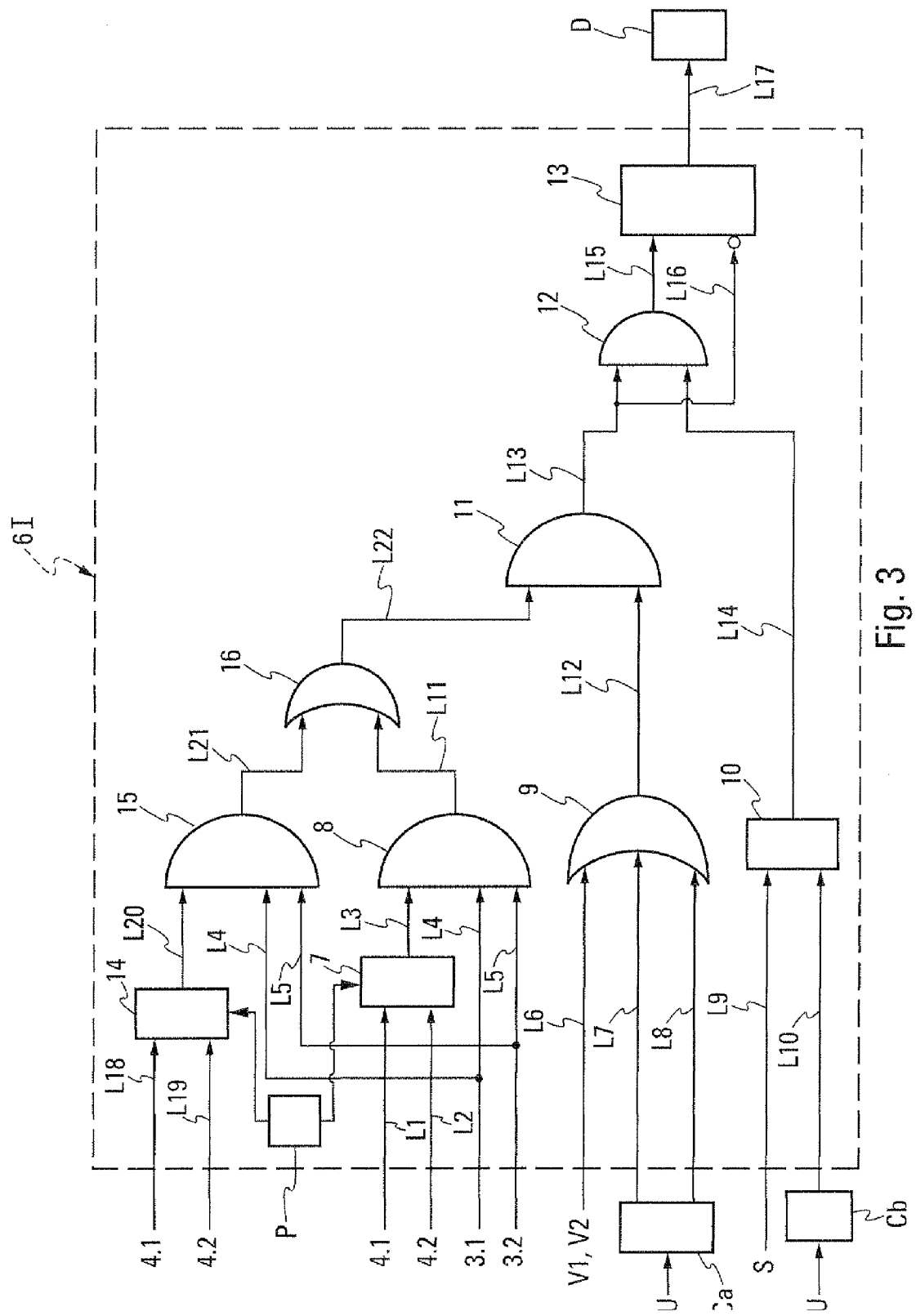
FIG. 3 represents, in a block-diagram shape, an alternative according to this invention of the device on FIG. 2.

In the preferred alternative embodiment shown on FIG. 3, the detection device 6.1 of the warning calculator is further able to detect the first lever position dissymmetry case, then to trigger a warning the case being.

Therefor, as illustrated on FIG. 3, in addition to the already described elements of FIG. 2, the detection device 6.I comprises:
second detection means 14 receiving at the input, via the links L18 and L19, position information respectively emitted by both levers 4.1 and 4.2. They are additionally linked to the determination means P. When both levers 4.1 and 4.2 occupy the thrust inversion position IV, such detection means 14 emit, at the output, a value <<0>>. On the other hand, when at least one of the levers 4.1, 4.2 occupies the thrust inversion position IV and the other lever 4.1, 4.2 occupies a position ahead the idling position 0 at least equal to the position threshold Ref, the second detection means 14 emit, at the output, a value <<1>>. Such second detection means 14 can also wait during a position confirmation time delay for the levers 4.1 and 4.2 (for instance equal to 1 s) before emitting a value;
a fourth three input AND logic gate 15, receiving at the inputs thereof the output value of the second detection means 14 as well as information relating to the rotation state of the moving elements of each of the engines, via respectively the links L20, L4 and L5. When the moving elements of both engines 3.1 and 3.2 are in rotation and the second detection means 14 deliver a value <<1>>, the fourth AND gate 8 emits, at the output, a value <<1>>; and
a second two input OR logic gate 16, receiving at the inputs thereof the output value of the first AND gate 8 as well as that of the fourth AND gate 15, via respectively the links L11 and L21. Thus, when at least one of the inputs thereof receives the value <<1>>, the second OR gate 16 delivers, at the output, the value <<1>> transmitted to the second AND gate 11, via the link L22.

Thus, the detection device 6.I of FIG. 3 can detect the first and second dissymmetry cases of the levers. After the first dissymmetry case (or the second case) has been detected, switching the levers in the dissymmetric position associated with the second (or the first) dissymmetry case does not require implementing the above mentioned position confirmation time delay (equal to 1 s), so as to avoid disrupting the emitted warning.

In the preferred alternative embodiment, the warning associated with the detection of the second lever 4.1 and 4.2 position dissymmetry cases, according to this invention, could also be implemented for reporting the first above mentioned lever dissymmetry case and thus replace the usually used red warning.

What is claimed is:

1. A method for detecting, upon a landing, a thrust dissymmetry of an aircraft (AC) provided with at least two engines (3.1, 3.2) individually controlled by control levers (4.1, 4.2) able to occupy several positions each associated with an engine speed, amongst which a position (0) corresponding to the idling speed and a position (III) corresponding to a maximum take-off and go-around speed, comprising:

A/ determining preliminarily a position threshold being intermediary between said idling position (0) and said maximum speed position (III), and such that, when at least one of said control levers (4.1, 4.2) is positioned between said position threshold and said maximum speed position (III) and at least another of said control levers (4.1, 4.2) occupies said idling position (0), a thrust dissymmetry of the engines (3.1, 3.2) is observed;

B/ checking that at least one condition relating to landing is validated;

C/ detecting that at least one of said control levers (4.1, 4.2) occupies an intermediary position comprised between said position threshold and said maximum speed position (III), as well as that at least another control lever (4.1, 4.2) occupies said idling position (0); and D/ when said landing condition is validated and at least one of said control levers occupies said intermediary position, at least another control lever occupying said idling position, emitting at least one warning to the pilots of said aircraft (AC), so as to notify them of a position dissymmetry of the control levers (4.1, 4.2).

2. A method according to claim 1, wherein said control levers (4.1, 4.2) of said aircraft (AC) being able to occupy a derated take-off position (II) corresponding to an engine speed lower than the engine speed of said maximum speed position (III), and wherein, when step D/ is performed, said emitted warning is disrupted, as soon as at least one of said control levers occupies a position comprised between said derated take-off position (II) and said maximum speed position (III).

3. A method according to claim 1, wherein, when step D/ is performed, the emitted warning is disrupted as soon as said control lever (4.1, 4.2) occupying said intermediary position is brought by the pilots in a position comprised between said idling position (O) and said position threshold.

4. A method according to claim 1, wherein said engines (3.1, 3.2) of the aircraft (AC) being provided with thrust inverters and said control levers (4.1, 4.2) being able to occupy a position (IV) associated with a thrust inversion speed, and wherein, when step D/ is performed, the emitted warning is disrupted as soon as said control lever (4.1, 4.2) occupying said intermediary position is brought by the pilots in a position comprised between said thrust inversion position (IV) and said position threshold.

5. A method according to claim 1, wherein said landing condition is validated when at least one of the following conditions is met:
   said aircraft (AC) is in contact with the ground;
   after having preliminarily touched the ground, said aircraft (AC) is in a wheel rebound phase during which it is no longer in contact with the ground.

6. A method according to claim 1, said aircraft (AC) being provided with retractable air brakes (V.1, V.2) able to occupy an extended position and a retracted position, wherein said landing condition is validated when said air brakes (V.1, V.2) occupy said extended position.

7. A method according to claim 1, wherein said warning is able to be triggered when at least one of the following activation conditions is validated:
   the velocity (S) of said aircraft (AC) is at least equal to a predetermined velocity threshold;
   a predetermined time delay, triggered upon contact of said aircraft (AC) with the ground, is not completed.

8. A method according to claim 1, wherein said emitted warning comprises a continuous emission of a speech reminding indication, the emission rhythm of which is not regular.

9. A device for implementing the detection method as specified in claim 1, on board an aircraft (AC) provided with at least two engines (3.1, 3.2) individually controlled by control levers (4.1, 4.2) able to occupy several positions, each associated with an engine speed, amongst which a position (0) corresponding to the idling speed and a position (III) corresponding to a maximum take-off and go-around speed, comprising:
   means (P) for determining a position threshold being intermediary between said idling position (0) and said maximum speed position (III), and such that, when at least one of said control levers (4.1, 4.2) is positioned between said position threshold and said maximum speed position (III) and at least another of said control levers (4.1, 4.2) occupies said idling position (0), a thrust dissymmetry of the engines (3.1, 3.2) is observed;
   means (9) for checking that at least one condition relating to landing is validated;
   means (7) for detecting that at least one of said control levers (4.1, 4.2) occupies an intermediary position comprised between said position threshold and said maximum speed position (III), as well as that at least another control lever (4.1, 4.2) occupies said idling position (0); and
   means (13) for triggering at least a warning to the pilots of said aircraft (AC), when said landing condition is validated and at least one of said control levers occupies said intermediary position, at least another control lever (4.1, 4.2) occupying said idling position.

10. An aircraft, comprising a device (6) such as specified in claim 9.

* * * * *